United States Patent [19]

Nesbitt et al.

[11] Patent Number: 4,616,217

[45] Date of Patent: Oct. 7, 1986

[54] VISUAL SIMULATORS, COMPUTER GENERATED IMAGERY, AND DISPLAY SYSTEMS

[75] Inventors: Norman R. S. Nesbitt, Newark; Edwin Skeels, Earl Shilton; Robert W. Laker, Braunstone; Terence W. Rowley, Nuneaton; Michael E. Judge, Groby, all of England

[73] Assignee: The Marconi Company Limited, Stanmore, England

[21] Appl. No.: 380,295

[22] Filed: May 20, 1982

[30] Foreign Application Priority Data

May 22, 1981 [GB] United Kingdom ............... 8115866

[51] Int. Cl.$^4$ ............................................. G09G 1/00
[52] U.S. Cl. ................................. 340/747; 340/729; 340/705; 340/717; 340/703; 358/88
[58] Field of Search ............... 340/703, 717, 725, 747, 340/729, 705; 358/87, 88, 104, 231, 237

[56] References Cited

U.S. PATENT DOCUMENTS

| | | | |
|---|---|---|---|
| 3,644,935 | 2/1972 | Lourie | 340/717 |
| 3,684,876 | 8/1972 | Sutherland . | |
| 3,736,564 | 5/1973 | Watkins . | |
| 3,763,365 | 10/1973 | Seitz . | |
| 3,784,742 | 1/1974 | Burnham et al. . | |
| 3,809,457 | 5/1974 | Kurtz et al. | 350/128 |
| 3,810,138 | 5/1974 | Thompson et al. | 340/728 |
| 3,816,726 | 6/1974 | Sutherland et al. . | |
| 3,889,107 | 6/1975 | Sutherland . | |
| 3,909,525 | 9/1975 | Fagan | 358/87 |
| 4,054,907 | 10/1977 | Itoh et al. . | |
| 4,181,953 | 1/1980 | Osofsky . | |
| 4,208,719 | 6/1980 | Lotz et al. . | |
| 4,291,380 | 9/1981 | Robner | 364/522 |

FOREIGN PATENT DOCUMENTS

| | | |
|---|---|---|
| 2406168 | 8/1974 | Fed. Rep. of Germany . |
| 596813 | 1/1948 | United Kingdom . |
| 606010 | 8/1948 | United Kingdom . |
| 1535839 | 12/1978 | United Kingdom . |
| 2030429 | 4/1980 | United Kingdom . |
| 2043972 | 10/1980 | United Kingdom . |
| 2051525 | 1/1981 | United Kingdom . |

OTHER PUBLICATIONS

*Clipping Using Homogeneous Coordinates*, Blinn et al., Computer Graphics, vol. 12, #3; Aug. 1978.
*A Characterization of Ten Hidden Surface Algorithms;* Sutherland; Tutorial: Computer Graphics; IEEE Cat. No. EHO 147-9; Feb. '79; pp. 293-347.
*Shaded Computer Graphics in the Entertainment Industry;* Crow; Tutorial: Computer Graphics; IEEE Cat. No. EHO 147-9; Feb. '79; pp. 382-393.
"A Real-Time Three-Dimensional Graphics Display", Sale, Bromley, The Australian Computer Journal, vol. 7, No. 1, Mar. 1975, pp. 15-20.
"Computer Generated Graphics", Bennett, SPIE, vol. 59, (1975) Simulators & Simulation, pp. 3-10.
"Computer Generated Imagery for Training Simulators", Rowley, Displays, Jan. 1981, pp. 199-202.
"The Capability of Computer Generated Imagery in Marine Simulation", Horne, from Maxim 78 First International Conference on Marine Simulation, pp. 105-122, by the College of Nautical Studies, Southampton, 1978.
"The Capability of CGI in Flight Simulation", Rowley, from 50 Years of Flight Simulation, published in 1979, American Inst. of Aeronautics, pp. 43-50.
"Computer Generated Imagery", Rowley, Video & Audio Visual Review, 1977, Jan., pp. 24-25.
"Computer Displays", Sutherland, Scientific American, Jun. 1970, vol. 222, No. 6, pp. 2-18.
"Computer Generation of Images the Multi-Purpose Tool", Bunker, SPIE, vol. 59 (1975) Simulators and Simulation, pp. 25-39.
"Lumiscope Lens-Screen System for Color Television", Ryu, Sep. 1972, Journal of the SMPTE, vol. 81, pp. 668-671.
"Illumination for Computer Generated Pictures", Communications of the ACM, Jun. 1975, vol. 18, No. 6, pp. 311-317.

*Primary Examiner*—Marshall M. Curtis
*Attorney, Agent, or Firm*—Spencer & Frank

[57] ABSTRACT

A display system having a screen and two spaced projectors arranged to illuminate respective parts of the screen. The screen includes a diffusor which serves to scatter light incident on the screen at a particular point in a manner such that more of the light is propagated, after scattering, more in a given direction of maximum intensity than in any other given direction. The screen has a refractor which serves to deflect the light before or after scattering from adjacent points of the different parts so as to reduce or eliminate an angle between the directions of maximum intensity for these adjacent points.

22 Claims, 11 Drawing Figures

VISUAL SIMULATORS, COMPUTER GENERATED IMAGERY, AND DISPLAY SYSTEMS

BACKGROUND OF THE INVENTION

This invention arose in the design of a simulator for training crew for aircraft, ships and land vehicles and relates particularly to computer generated imagery techniques for such a simulator.

Particularly where it is desired to simulate a scene for training a ship's crew or captain, or where it is desired for more than one person to view the same screen, it is necessary to provide a particularly large screen, which preferably curves around the observer so as to provide a wide angle of view. In such circumstances it may be necessary to illuminate the screen using two or more projectors at different positions. Initial attempts to build a suitable multiple-projector display like this suffered from the problem that a dividing line could be seen where the part of the image displayed by one projector joined another part displayed by another projector. This dividing line arose because the observer, when located at certain positions in front of the screen was more directly in line with one projector than the other. Thus, to reach the observer, light from one projector had to be diffused through a larger angle than that from the other projector. Hence one part of the picture appeared less bright than the other: thus resulting in the dividing line between the parts of the picture.

SUMMARY OF THE INVENTION

This problem is mitigated by the present invention which provides a display system comprising a screen and two spaced projectors arranged to illuminate respective parts of the screen, the screen comprising: diffusion means serving to scatter light incident on it at a particular point in a manner such that more of said light is propagated, after scattering, in a given direction of maximum intensity than in other directions; and refraction means serving to deflect the light before or after scattering from adjacent points of the said different parts so as to reduce or eliminate an angle between the directions of maximum intensity for said adjacent points.

A second aspect of the invention relates to the preparation of a data base defining features which are required to appear in a simulated image. This aspect of the invention provides apparatus for storing video data defining a surface extending in three dimensions x,y and z, the apparatus comprising: first storage means for recording z values of the surface for different x and y co-ordinate values; second storage means for recording groups of x and y co-ordinate values defining respective adjacent polygonal areas of the surface, which areas together define a region of the surface having a distinct visual characteristic; and reading means for reading from the first storage means, z co-ordinate values associated with each x,y co-ordinate value recorded in the second storage means. Preferably further storage means is provided for recording further groups of x and y co-ordinate values defining further respective adjacent polygonal areas of smaller average size than the first-mentioned areas. Further means is then provided for reading, from the first storage means, z co-ordinate values associated with each x,y co-ordinate value recorded in the third storage means. Thus only a single store for z values is required, thereby reducing the amount of storage required in the data base and simplifying the process of entering the data.

The need to record, in the data base, data defining polygons of relatively large and relatively small size arises from a third aspect of the invention which provides apparatus for generating successive picture frames depicting a feature to create an illusion of movement comprising: a first store containing a description of each of a plurality of relatively large faces of the feature to be displayed; a second store containing for each of the relatively large faces, a description of each of a group of relatively small faces, together constituting the large face, each description of a face including a definition of its location and a value which defines its brightness or colour; means for feeding data from the stores to a processor adapted to process the data into a form for feeding to a display device so as to produce an image formed from successive picture frames; switching means for switching a connection to the processor from the first store to the second store between successive frames; and switch-over control means for displaying a group of small faces immediately after said switch-over with substantially uniform colour or brightness values and changing these values between frames subsequent to the switch-over towards their respective different values as determined by their description in the second store. Of course more than two stores can be provided for storing data at more than two levels of detail. The switching means is preferably operative to select, at any one time, that store which results in the processor being used most nearly to its maximum capacity.

There is a need to calculate from 3D co-ordinates of each vertex of a polygon, new co-ordinates in 2D representing an image of the polygon as viewed by an observer at a particular position, since, in the case of an aircraft, ship or land vehicle, the observer will normally be moving and will at times be in a position where at least one vertex of a polygon is behind him and at least one is in front of him. The normal mathematical projection techniques fail to deal with this situation. The problem is solved by a fourth aspect of the invention which provides apparatus for producing, from the co-ordinates of the end points of a line, a two dimensional image depicting the line as viewed by an observer having one of said points behind him and one in front of him, the apparatus comprising: means for determining a first set of co-ordinates where an image plane is intersected by a line joining the observer to the end point in front of him; means for determining a second set of co-ordinates where the image plane is intersected by the extension of a line joining the observer to the end point behind him, and means for displaying on a screen, corresponding to said image plane, a visible line defined by an extension of the line joining the first and second co-ordinates.

A fifth aspect of the invention deals with a problem in the display system where for example, a horizontally scanned raster crosses a dividing line between adjacent polygons to be depicted and where this dividing line makes an acute angle with the horizontal scan lines. In the normal way, if each line of the raster were to change brightness or colour suddenly when the centre point crosses the line, the line would appear to have a stepped configuration on the display since the point of change would be different for each scan line. Various edge smoothing techniques have been proposed for overcoming this problem which in essence, serve to blurr the image to a sufficient extent to obscure the steps. The fifth aspect of this invention overcomes the need for such "blurring" by preventing, in the first place, the generation of severely noticeable steps in the image. According to this fifth aspect of the invention there is provided a raster display system comprising: means for defining a line to be displayed; means for determining the instant when a first part of a raster spot crosses said line and providing a first control signal which changes at that instant; means for determining the instant when a second part of a raster spot crosses the line and providing a second control signal which changes at that instant; means for providing a combined control signal from the first and second control signals; and means for using the combined control signal to vary the brightness and/or colour of the raster spot gradually as it crosses the line.

In a computer generated imagery system having a data base containing descriptions of polygonal faces defining objects or scenes to be depicted in an image it is usually necessary to provide some means for ensuring that, for a particular point of observation relative to the object or scene, faces which are hidden by other faces are not displayed. To deal with this problem it has previously been proposed for each face to be allocated, in the data base, a code defining the direction in which it is directed. Faces directed away from the observer are not displayed. This technique is satisfactory for a simple object such as a cube or sphere but does not work for more complex shapes where one face, directed towards the observer may obscure another also directed towards the observer. To deal with such situations it is necessary to allocate to each face, a priority value, these priority values defining a hierarchy which determines which faces pointing generally towards rather than away from the observer are capable of obscuring other faces also pointing towards the observer. Thus a face of priority 1 could be defined as being able to obscure any face of lower priority, e.g. of priority 2, etc., etc.

This simple allocation of priorities works in most situations but not for all situations. It cannot, for example, satisfactorily handle an object or surface having a "saddleback" shape, such as that shown at 3 in FIG. 1 (to be described later). For such a shape it is found impossible to allocate priorities as mentioned above. This problem is explained in detail in a paper "A real-Time Three Dimensional Graphics Display" by A. H. Sale and A. G. Bromley in the Australian Computer Journal Vol. 7 No. 1 March 1975. This paper illustrates the problem with reference to FIG. 3. The problem has now been solved in accordance with a further aspect of the invention by giving each face more than one and preferably four priorities, one for each of four different angles of view.

BRIEF DESCRIPTION OF THE DRAWINGS

One way in which the invention may be performed will now be described with reference to the accompanying drawings of a simulator constructed in accordance with the invention. In the drawings.

DESCRIPTION OF THE PREFERRED EMBODIMENTS

Data Base Preparation

Figures 1, 1A:
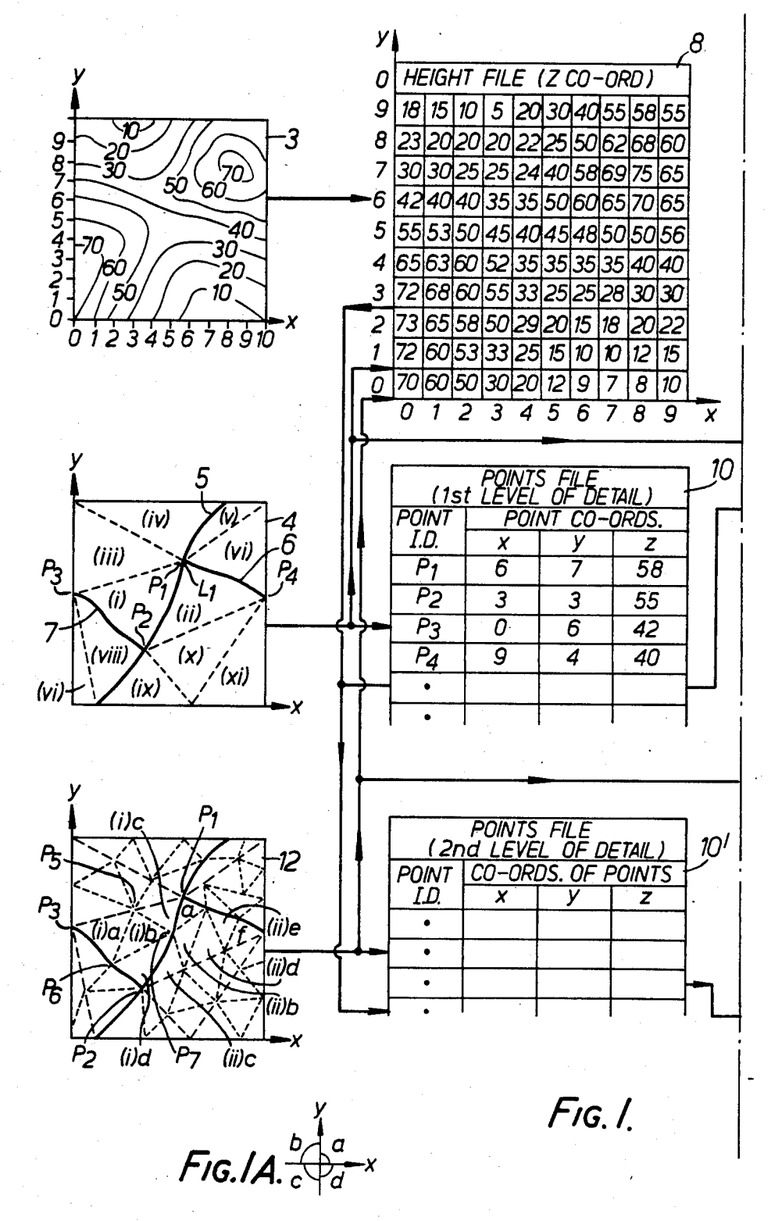
FIG. 1 is a schematic block diagram of apparatus for preparing what will be termed the "data base" which is a digital recording of three dimensional information defining features to appear in simulated scenes.
FIG. 1A is a schematic diagram illustrating four different angles of view from which an observer may view a simulated object.
Figure 1:
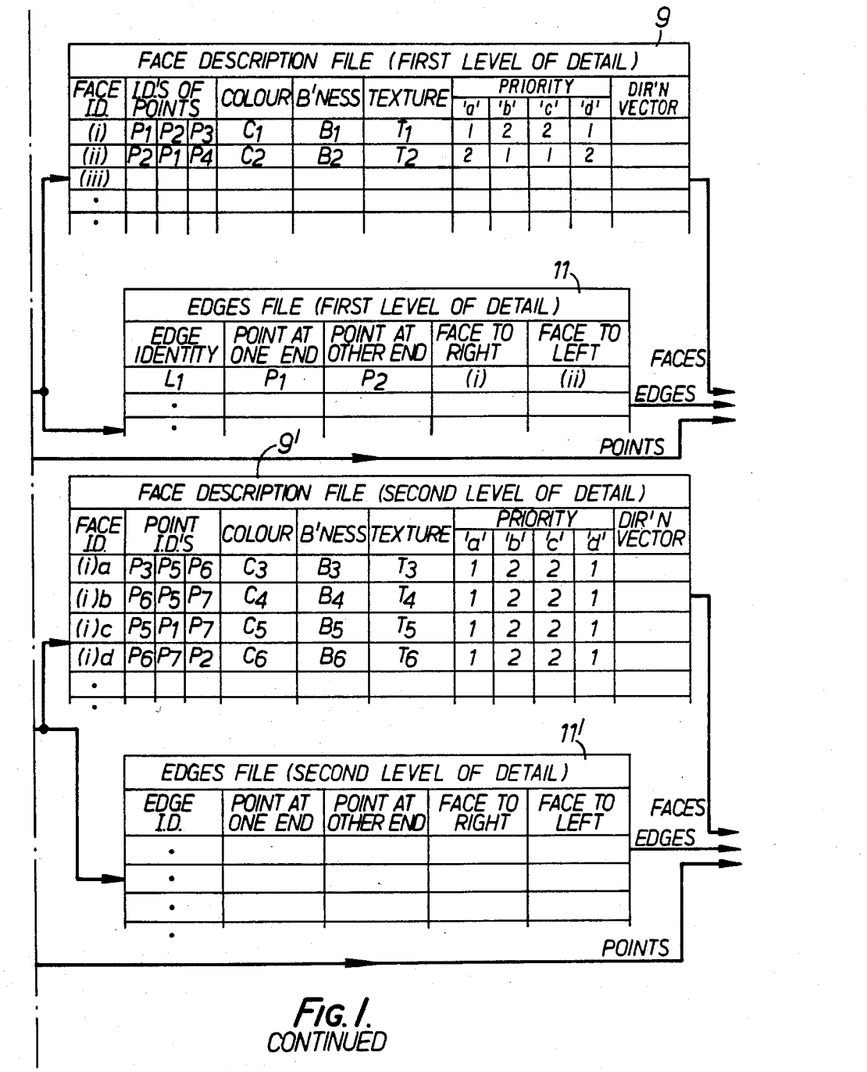

It is desired to produce images on a display screen 1 (FIG. 2) visible by an observer who will normally be at position 2 (also FIG. 2) but may move to other positions, e.g., 2A and 2B, in front of the screen 1. The images simulate a scene which would be visible by the observer when travelling in a vehicle over terrain divided into a number of square regions (called tiles). A contour map of one "tile" is shown at 3 (FIG. 1). The same region or tile is also depicted by a map shown at 4 (FIG. 1) and is divided by lines of visual discontinuity 5,6 and 7 into four areas which are distinguishable by their colour, brightness or texture. Examples of such different areas might be areas of woodland, urban development, water, grass, crops, etc.

The data contained in the maps 3 and 4 needs to be stored in digital form and the process of doing this is called Data Base Preparation and will now be described with reference to FIG. 1. This can be done with the assistance of a suitable general purpose computer such as a CIG general purpose PDP VAX 11/780 or a Marconi 920 Advanced Technology Computer to perform some of the tasks to be described below. The map 3 is first transposed into digital form and stored in a memory 8 which is called the "height file". The height file is in the form of a table as shown, having height values associated with respective grid crossing points on the map 3. The transposition of the height information from the map 3 into the height file 8 can be done entirely manually by an operator who studies the map 3 and deduces from the contour lines, and from a process of interpolation a height value for each x-y address in the height file. The height value for each such address can then be entered in the height file, e.g., using a keyboard. This operation, when performed entirely manually, can be time consuming and so an alternative method is preferably used in which a digitiser is used. The digitiser is traced along the contour lines and automatically produces a signal representing the x and y values of its current position. The operator enters the height of the contour lines currently being traced and this height is automatically entered in the height file at the x-y positions through which the digitiser passes. Preferably a mathematical interpolation method, e.g., using the aforementioned Marconi 920 Advanced Technology Computer previously mentioned is used to enter the appropriate height values in the height file at x-y addresses therein through which addresses the digitiser has not passed.

The map 4 is also transposed by the operator into digital form and this is stored in a table 9 which is termed the "face description file"; a table 10 constituting the "points file" and a table 11 constituting the "edges file". This operation can also be done entirely manually by the operator who first divides each of the aforementioned four areas into polygonal faces, in this instance triangles, of a size chosen to fit very approximately to the discontinuity lines 5,6 and 7. In the illustrated example the map 4 is divided as shown by the broken lines which the operator physically draws on the map. The points, e.g., points $p_1$ to $p_4$, of the thus formed triangles are each given an identity number which is entered in the first column of the points file 10. The appropriate x and y co-ordinates of these points are then entered by the operator in the second and third columns of the points file 10. These x-y co-ordinates are also used by the operator to address the height file 8 and to produce a read out of the appropriate height value which the operator then enters in the fourth column of the points file 10. When so entering information in the points file 10 the operator gives each point, e.g., $p_1$, an identity number which can conveniently be marked on the map 4 to serve as a reminder.

The operator now enters information defining each triangular face into the face description file 9 which is a table having twelve eleven columns as shown. The first column contains a number identifying the face, e.g., face (i). The next three columns contain numbers identifying the points or vertices of that face, e.g., points $p_1,p_2$ and $p_3$, taken in a predetermined direction, i.e. clockwise or anticlockwise. The fifth column contains a number, e.g., $C_1$, identifying the colour of the face, e.g., green. The colour is identified by a number according to a scale in which the lowest number represents a colour at one end of a spectrum of colours and the highest number represents a colour at the opposite end of the spectrum. The sixth column contains another number identifying the brightness of the face, this also being chosen according to a scale in which the level of brightness is directly or inversely proportional to the size of the code number. The next, seventh, column contains another code number defining the texture of the face. The eighth, ninth, tenth and eleventh columns contain priority numbers for observers looking in directions within four angles (a), (b), (c) and (d) as indicated in FIG. 1A. The priority number given to a face denotes its capability of being obscured or of obscuring another face. Thus, a face having a priority 1 cannot be obscured by any other face; a face of priority 2 can only be obscured by faces of priority 1; a face of priority 3 can only be obscured by faces of priority 1 or 2 and so on. In some cases for example in the case of faces (i) and (ii), different priorities are applicable to different directions of view. Thus, in the illustrated example, face (i) has a priority of 1 for view directions a and d and a priority 2 for directions b and c. The final twelfth column of the face description file contains a "direction vector" code which defines a direction perpendicular to the plane of the face. This is of important since, during subsequent processing of the information, details of faces pointing away from the observer must not be displayed. This vector can be derived from the co-ordinates of the vertices of the face and this method is known (see for example "A Review of Some of the More Well Known Methods.Applicable to Simulating" by W. G. Bennett published in SPIE Vol.59 (1975) Simulators and Simulation). The direction vector code is calculated automatically by suitable programming of the aforementioned computer, from the co-ordinates of the points defining the vertices of the face. The calculations and use of such direction vectors are known, and reference is made to a paper entitled "Computer Generated Graphics a Review of Some of the More Well-known Methods Applicable to Simulation" by William S. Bennet published in SPIE Vol. 59 (1975) Simulators and Simuation.

The operator now uses information from the map 4 to enter data in a table 11, which is called the "edges file" because it contains data defining the edges of the triangles. In the first column of the edges file the operator enters numbers identifying the edges, e.g., edge $L_1$. The second and third columns contain the identities (e.g., $p_1$ and $p_2$) of the points at the beginning and end of the edge. The fifth and sixth columns contain the identities of the faces to the left and to the right of the edge respectively. The left and right sides are determined according to the clockwise or anticlockwise convention previously referred to.

As in the case of the height file 8, the information in the files 9,10 and 11 can be entered entirely manually by an operator who inspects the map 4 and works out from it the appropriate data which he enters by means of a keyboard; or, alternatively, this can be done automatically. A similar digitiser to that previously described can be used for this purpose, the digitiser being traced along the lines of discontinuity 5,6 and 7 to provide a series of co-ordinate values spaced equally along those lines, which co-ordinate values are entered into a store. The information in this store is then processed mathematically within the Marconi 920 Advanced Technology Computer by suitable programming of it to produce data defining triangles like those shown at (i) to (xi) as shown on the map 4. All the information for the files 9,10 and 11 is thus made available and entered automatically at the appropriate table positions: each of the points $p_1$ to $p_4$, etc., the faces (i) to (x), etc., and the edges $L_1$, etc., being allocated identity numbers automatically.

It will be noted that the triangles into which the area shown on the map 4 is divided are relatively large and that the information in the files 9,10 and 11 is therefore only a rough approximation to the more detailed information available on the map 4. For this reason the files 9,10 and 11 are marked on FIG. 1 as being "first level of detail." In order to provide a recording of the available information at a higher, second, level of detail the operator now divides each of the previous triangles into a number of smaller triangles as shown in dotted lines at 12. Thus, the triangular face (i) is divided into smaller triangular faces (i)a, (i)b,(i)c and (i)d. Details of these traingles are entered in a second face description file 9', and second points file 10' and a second edges file 11' in exactly the same way as before. However, the same height file 8 is used to obtain the z co-ordinate for entry in the points file 10'. In practice many further levels of detail are entered in further points files, face description files and edges files, but the present description is confined to a system utilising two levels of detail for simplicity of description. It will be appreciated, however, that the larger the number of levels of detail the greater is the advantage of using the common height file 8.

Particularly where very high levels of details are required it may be advantageous to use an interpolation method when reading from the height file a height value corresponding to particular x-y co-ordinates. Such an interpolation can be carried out either by the judgement of the operator; or automatically using a mathematical process defined by suitable programming of the Marconi 920 Advanced Technology Computer. The whole of the process of data base preparation is repeated for each "tile" of the terrain, additional face description files, points files and edges files being provided for each tile.

When the various tables have been compiled the information on them is transferred into disc stores 13 and 14 (FIG. 2), one disc store being used for each level of detail. The disc stores are then loaded into the scenario processor 15 also shown in FIG. 2.

The Scenario Processor

Figure 2:
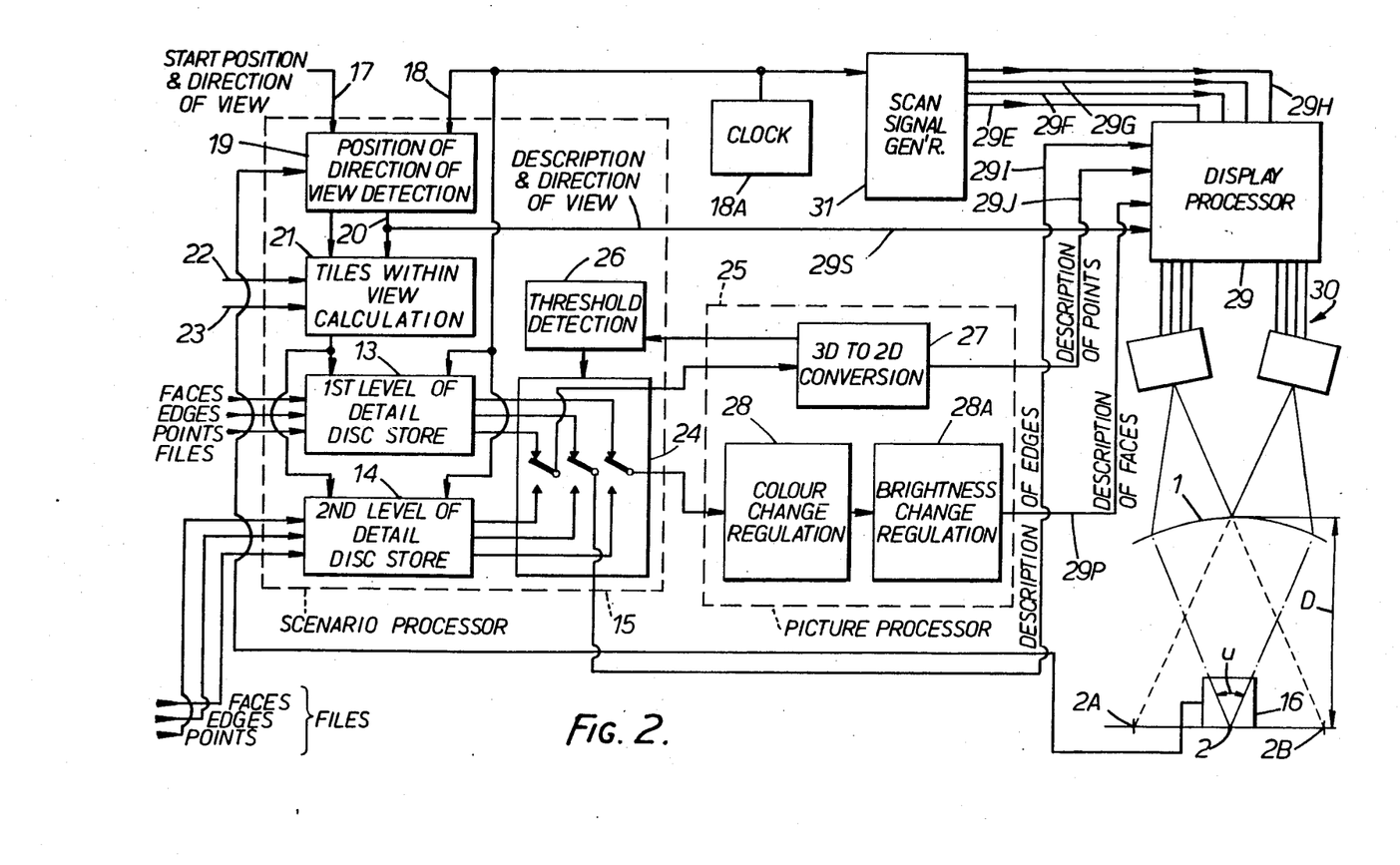
FIG. 2 is a block circuit diagram of apparatus for producing a display from the information in the data base, this apparatus including what will be termed a "scenario processor" for controlling the sequence of events to be portrayed by the display, a "picture processor" for processing three dimensional information from the scenario processor into two dimensional information for display; a "display processor" for presenting information from the picture processor in a form suitable for reception by an optical projection system, and the optical projection itself.

The scenario processor 15 comprises another general purpose computer such as a DCS PDP Vax11/780 and an ES PDP 11/34 or a Marconi Locus 16 Computer. This receives a code generated by a control 16 which can be manipulated by the observer 3. This code defines velocities of movement in three co-ordinates and angular velocities in two planes. The control 16 can be similar to that described and shown at 236 in U.S. Pat. No. 3,736,564. The scenario processor 15 also receives a code 17 which defines a starting position and is derived from a tape or disc programmed with rates defining the training exercise; and a clock signal on line 18 which is derived from a clock 18A and occurs for each frame of a cathode ray tube display device to be described later. These codes are used by a position calculating circuit 19 to calculate the instantaneous position and direction of view. This information is presented in the form of a signal 20 to a circuit 21. The circuit 21 also receives a signal 22 defining the angle of view u and a signal 23 defining the range of view which determines the visibility conditions which it is desired to simulate. The signal 22 is pre-set according to the size of the screen 1. The signal 23 can also be pre-set or can be arranged to change according, for example, to the simulated height of the observer 2. From this received information the circuit 21 calculates the "tiles" currently in view. Each clock signal from 18A reads from the disc stores 13 and 14 information pertaining to those tiles; and this information is presented to a switch shown schematically at 24, which selectively passes low definition information from disc 13 or high definition information from disc 14 to a second processor 25 which is called the "picture processor" because it compiles information for the production of a two dimensional picture from the three dimensional data presented to it.

A threshold detector 26 counts the number of faces per frame fed to the picture processor 25 and, if this is below a threshold(which is equal to the number of faces per frame which can be processed by a picture processor to be described later) causes the switch 24 to adopt its lower position so as to receive higher definition data from the disc store 14. In this way the picture processor 25 is always used to its maximum capability.

Where more than two levels of detail are to be used then, of course, the switch 24 would have several different positions. It will be understood that the three individual switches shown at 24 are linked so as to move in unison with each other.

Picture Processor

Figure 3:
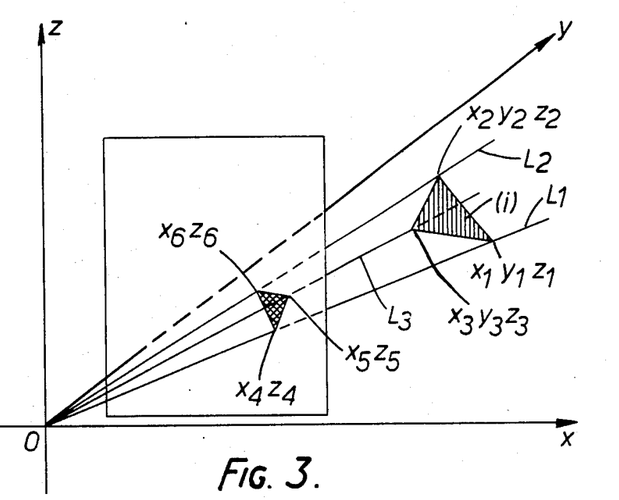
FIGS. 3 and 4 are schematic diagrams illustrating the effect of mathematical projections from three dimensions to two dimensions performed in the picture processor.

For each frame of information to be displayed the clock signals read the appropriate information from the store 13 or 14 via the switch 24 into the picture processor 25 formed by a further general purpose computer such as a Marconi Locus 16 Computer. This is except for the information defining the edges of the triangular faces, this information being fed direct to a display processor to be described later. Information defining the points of the faces (from the points file) is fed to a 3D to 2D converter circuit 27 which receives information about the position of the observer in the simulated scene, this information being obtained from the output of the circuit 19 in the scenario processor. The circuit 27 (which is a schematic representation of a suitably programmed part of the Locus 16 Computer) mathematically projects the three dimensional co-ordinates of a point onto a two dimensional plane spaced from the point of observation by a distance equal to the distance between the position 2 and the screen 1. A schematic illustration of this mathematical projection process for the triangular face (i) is shown in FIG. 3. It is a well known process as described for example in the aforementioned paper by W. S. Bennet and is performed by suitable programming of the Locus 16 Computer previously referred to.

Referring to FIG. 3 the x,y and z co-ordinates are shown with an origin at O where the observer is assumed to be for the purpose of simplifying this explanation. Of course in practice the observer will normally be required to appear to move and the co-ordinates of the observer as received from the circuit 19 will vary with time. The triangular face (i) has its vertices at co-ordinates $(x1,y1,z1)$, $(x2,y2,z2)$ and $(x3,y3,z3)$ and the programmed computer schematically shown as circuit 27 works out new co-ordinayes $(x4,y=D,z4),(x5,y=D,z5)$ and $(x6,y=D,z6)$ of an image of the face (i) projected onto a plane where $y=D$ and D is a positive value. D equals the distance between the observer and the screen 1.

The mathematical projection process can be performed in a relatively simple manner for each point of a triangular face by deriving equations defining the lines joining the vertices of the triangle (i) to the observer; and then calculating the points at which these equations are satisfied for the plane $y=D$. Alternative perspective transformation equations, e.g., as set out in U.K. Patent Specification No. 2051525A, can be used. When it is desired to project onto the aforementioned plane a face having at least one vertex behind the observer the normal projection procedure as described above will not work.

Figure 4:
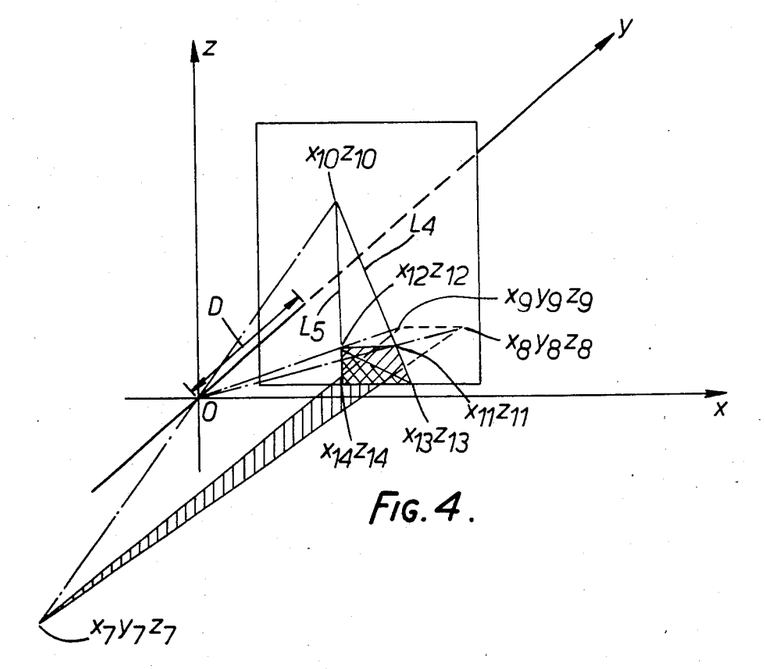

Such a triangular face is shown on FIG. 4, being defined by the vertices $(x7,y7,z7),(x8,y8,z8)$ and $(x9,y9,z9)$. A triangle like this is detected in the circuit 27 by comparing the y co-ordinate of the observer with the y co-ordinate of the signal entering the mathematical projection system 27. When such a detection occurs the projected co-ordinates $(x10,y10=D,z10)$ of the point $(xy,y7,z7)$ are used to calculate the co-ordinates $(x13,y=D,z13)$ of the point where the extrapolated line $L_4$ between points $(x10,y=D,z10)$ and $(x11,y=D,z11)$ meets at edge E of the plane of projection; and where the extrapolated line $L_5$ between points $(x10, y=D, z10)$ and $(x12, y=D, z12)$ meets the edge E. The co-ordinates $(x12, y=D, z12), (x11, y=D, z11)$ and $(x13, y=D, z13)$ on the one hand and the co-ordinates $(x12, y=D, z12), (x13, y=D, z13)$ and $(x14, y=D, z14)$ on the other hand are then used to define two projected triangular faces by different hatching on FIG. 4) and each is given the colour, brightness, texture and priority of the original triangular face before projection.

The face description file 9 is fed to a colour change regulator 28 which prevents sudden changes in colour when the level of detail is changed under the influence of the threshold detector. To understand this colour adjustment consider the situation when the level of detail is being increased by feeding a new frame of information to the picture processor containing details of faces (i)a,(i)b, (i)c and (i)d from the disc store 14 instead of face (i) from the disc store 13 as in the previous frame. In these circumstances, if no adjustment were effected, the face (i) would suddenly change from its uniform colour $C_1$ to the multiple colours $C_3, C_4, C_5, C_6$ of faces (i)a,(i)b, (i)c and (i)d. Conversely, when the level of detail has been decreased so that a new frame of information fed to the picture processor contains details of face (i) instead of individual faces (i)a,(i)b,(i)c and (i)d, the varying colours $C_3, C_4, C_5, C_6$ would, if no means were provided to prevent this, suddenly become a uniform colour $C_1$. These sudden transformations of colour would destroy the realism of the simulated scene. To avoid this the colour of each face is compared, in the circuit 28, with the arithmetical average colour of all faces having the same prefix in the previous frame of information. If the new colour value is higher or lower than the aforesaid average it is modified so as to equal the average plus one or the average minus one respectively. In this way, the colour of any given part of the scene can change by only one colour value between frames this being sufficiently gradual as to be not noticeable by the observer. In cases where the level of detail is being increased so that, for example, the one original face (i) is replaced by individual faces (i)a, (i)b, (i)c and (i)d, then the aforesaid "arithmetical average colour value" will simply be the colour value of the one original face (i).

It is similarly undesirable for sudden changes of brightness to occur when the level of detail is changed. Such changes of brightness are therefore controlled by a circuit 28A which operates on the brightness values in the same way that the circuit 28 operates on the colour values. For each frame of information the face description, duly adjusted by the circuits 28 and 28A; and the projected points from the circuit 27 are passed to a third processor 29 which is called the "display processor" because it processes the two dimensional information into a form acceptable by a display system indicated generally at 30.

The Display Processer

Figure 5:
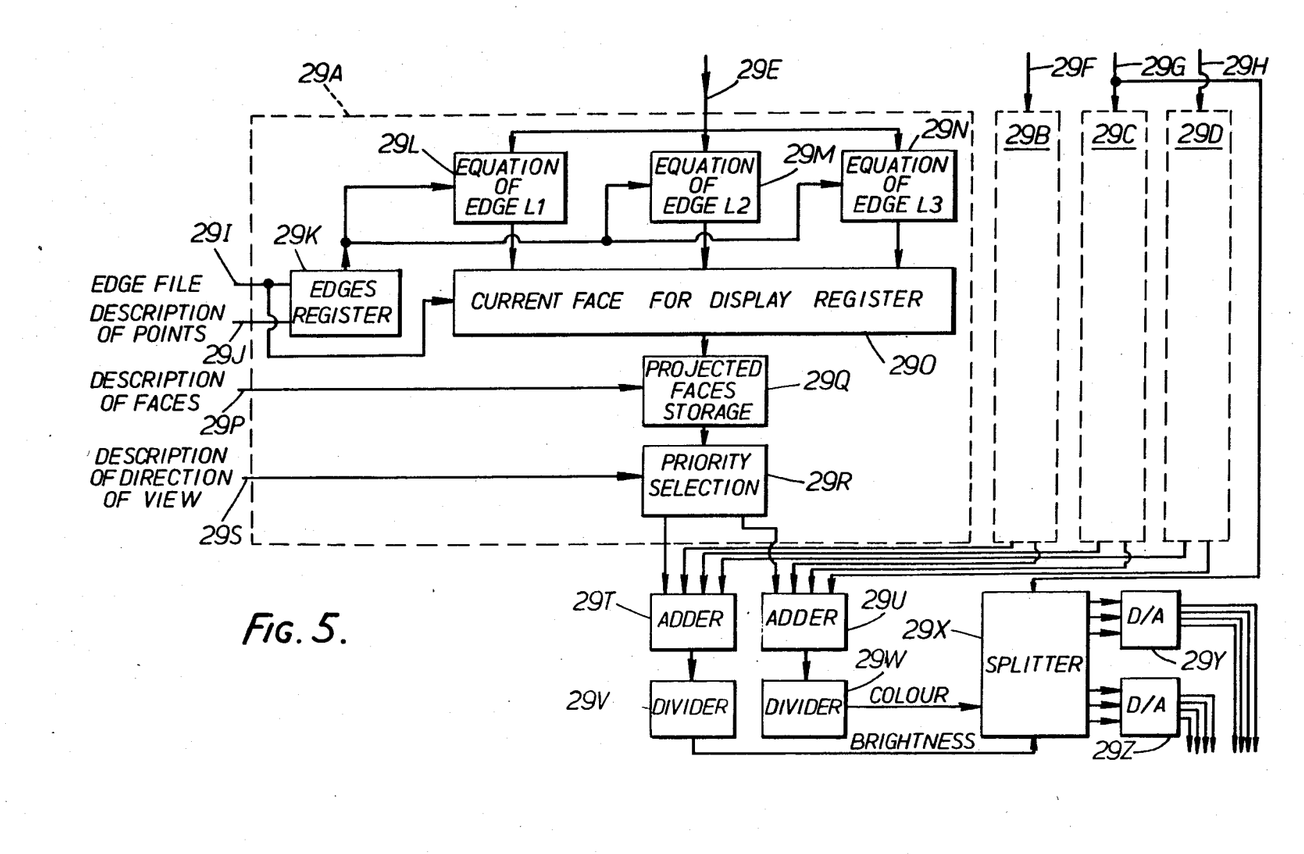
FIG. 5 is a block circuit diagram of the display processor shown as a single block on FIG. 2.

The display processor 29 (which can be another suitably programmed Marconi Locus Computer) is shown schematically in FIG. 5 and has four parts 29A, 29B, 29C and 29D which respectively receive, from a scan signal generator 31 (FIG. 2) digital signals representing the x and y co-ordinates of positions respectively at the top, the bottom and two intermediate positions between the top and bottom of the scanning spot of each of a number of cathode ray tubes included in projectors 30A and 30B (FIG. 2). The signals enter the display processor parts 29A, 29B, 29C and 29D at 29E, 29F, 29G and 29H respectively as shown in FIG. 5. The display processor also receives, at 29I details of the edges currently in view derived from the edges file 11 of FIG. 1 via the disc store 13 or 14. The display processor further receives, at 29J, the projected co-ordinates of the points currently in view. The information received on lines 29I and 29J for each frame is used, in a computing device 29K forming part of the previously mentioned computer, to compute, for each edge, an equation defining that edge. These edge-defining equations are stored in individual registers, e.g. as shown at 29L, 29M and 29N, forming part of the computer and the incoming co-ordinates entering at 29E of the top of the scanning spot are tested against these equations. When an equation defining a particular edge is satisfied the face identity to the right of that edge (determined by the information entering at 29I) is entered in a "current face for display", register 29O (also forming part of the computer) and the face identity to the left of the edge is erased from this register. Thus the register 29O contains the identities of all faces projected by the circuit 27 onto a point of the projected plane corresponding to the current top point of the raster spot. It will be appreciated that more than one such face will be so projected onto the same spot where one face obscures another.

The part 29Q of the display processor 29 receives at 29P, from the picture processor 25, a description of all the projected faces and these are arranged under the control of the computer program in the table 29Q similar to that shown at 9 on FIG. 1. The contents of register 29O, e.g., the identities of faces (i) and (ii), i.e., the faces projected onto the same position as the current position of the top of the spot are used to read out from the register 29Q the colour, brightness, texture and the four priorities of each of the faces. This information is presented to a priority selector 29R which receives a signal 29S from the scenario processor indicating within which angle (a),(b),(c) or (d) the observer is looking. The priority selector selects that face in register 29Q having the highest priority for that particular angle (a),(b),(c) or (d) of view. It also eliminates any faces whose direction vector is pointing away from the observer. The colour and brightness of the selected face are presented to inputs of respective adders 29T and 29U.

The adders 29T and 29U also receive other colour and brightness inputs from the circuits 29B, 29C and 29D which operate in the same way as 29A but receive signals 29F, 29G and 29H representing the co-ordinates of parts of the raster spot at other positions between the top and bottom thereof. The outputs of the adder 29T and 29U are divided by four at 29V and 29W to obtain the average colour and brightness values from the parts 29A, 29B, 29C and 29D. This averaging process avoids edges which are neither horizontal nor vertical having a stepped appearance as would be the case if the colour and/or brightness were changed abruptly at the instant when, say, the centre of the raster line crosses the edge concerned. Hitherto, proposals have been made, for example in U.S. Patent Specification No. 4,208,719, resolving the problem of a "stepped edge" by smoothing the stepped video signal so as to hide the steps. This procedure, however, (known as edge smoothing) requires some means for varying the degree of smoothing according to the slope of the edge: since no smoothing is required for a vertical edge.

Figure 6:
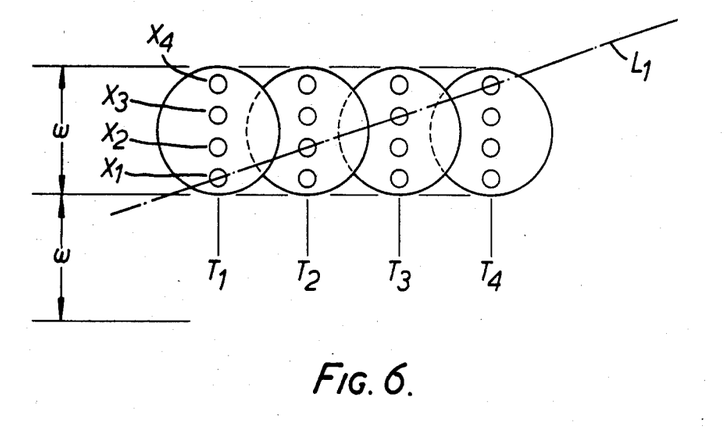
FIG. 6 is a schematic diagram of a raster spot of a cathode ray tube shown in FIG. 7.

The display processor 29, shown in FIG. 5, does not use an edge smoothing technique in that it does not generate a video signal defining a stepped edge, which is subsequently smoothed to remove the steps. Instead it avoids generating a stepped edge in the first place. The effect of the processor 29 is illustrated by FIG. 6 which shows the edge $L_1$ between faces (i) and (ii); and two adjacent raster lines of finite width w intersecting this edge $L_1$. A raster spot is shown in four positions which is adopted at times $T_1$, $T_2$, $T_3$ and $T_4$ respectively as 31, 31A, 31B and 31C. And it is the co-ordinates of points $X_1$, $X_2$, $X_3$ and $X_4$ of this spot which are represented by the four signals 29E to 29H entering respective display processor parts 29A to 29D. Thus the outputs of processor part 29A will change at time $T_1$, the ouputs of 29B will change at $T_2$, the outputs of 29C will change at $T_3$ and the outputs of 29D will change at $T_4$. Hence the average outputs from 29V and 29W change colour and brightness in a series of four different jumps during the period when the scanning spot is crossing the edge. The colour and brightness values of the raster spot therefore change gradually as the spot crosses a sloping edge between faces; thereby avoiding the stepped configuration previously referred to. In the case of a vertical edge, all the points $X_1$ to $X_4$ cross the edge simultaneously thereby producing the sudden colour changes required for a vertical edge. In the case of a horizontal edge bridged by the raster spot, the latter automatically adopts an average colour of those faces above and below the edge. The brightness and colour signals from circuits 29V and 29W and the x,y deflection signals 29G are processed in a circuit 29X so as to split them into two separate sets of signals for driving respective optical projectors 30A and 30B after being converted to analogue form at 29Y and 29Z.

Optical Projectors

Figure 7:
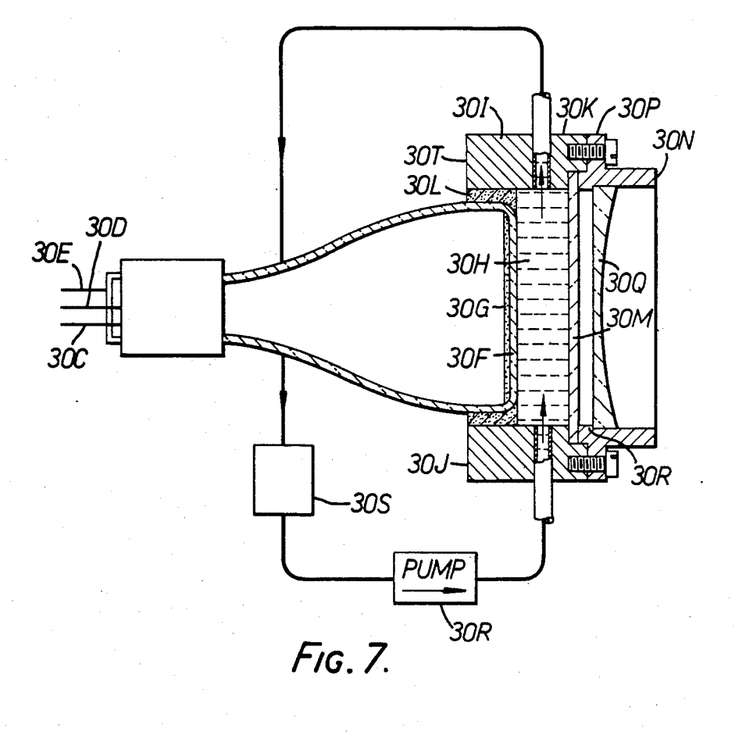
FIG. 7 is a vertical sectional view of a cathode ray tube three of which are included in each of the two projecters shown in FIG. 2.

Each of the optical projectors 30A and 30B projects half of the picture to be simulated on the screen 1 and consists of three cathode ray tubes which respectively handle red, blue and green colours. One of the cathode ray tubes is shown in FIG. 7 and has the usual inputs for x and y deflection signals 30C and 30D and for the brightness signal 30E. The inside surface of a front face 30F of the cathode ray tube bears a phosphor layer 30G and the outside surface of front face 30F is in contact with a body of water contained within a chamber 30H. The water chamber 30H is formed by a metal sleeve 30I and one end 30J of this sleeve passes around the perimeter of the face 30F. The other end 30K projects in front of the face 30F. The sleeve 30I is secured to and sealed with respect to the glass wall of the cathode ray tube by adhesive 30L. The front end 30K of the sleeve is rebated to receive a glass window 30M and a tubular lens holder 30N. The latter has a flange 30P by which it is bolted to the sleeve 30I. The holder 30N receives a lens assembly shown schematically at 30Q and incorporating a spherical and aspherical lens to provide the correct optical characteristics for projection of an image onto a convex rear surface of a screen to be described later. The lens assembly 30Q is spaced from the window 30M by a step 30U formed on the inner side of the holder 30N.

The water is circulated through the chamber 30H by a pump 30R and is maintained at a desired temperature by a thermostatically controlled cooler 30S. It has been found that, by using this technique, the tube can be operated at a very high brightness level without the glass face 30F cracking. The reasons for the success of the illustrated system is believed to be connected with the high heat capacity of the water and its flow characteristics which allow it effectively to transfer heat from hot to relatively cool areas of the front face of the cathode ray tube. Also, because the water flowing past the front face of the cathode ray tube is confined by the window to a region in close proximity with a cathode ray tube, water acquiring heat from hot parts thereof is likely to transfer this heat to the cooler parts.

The Screen

Figure 8:
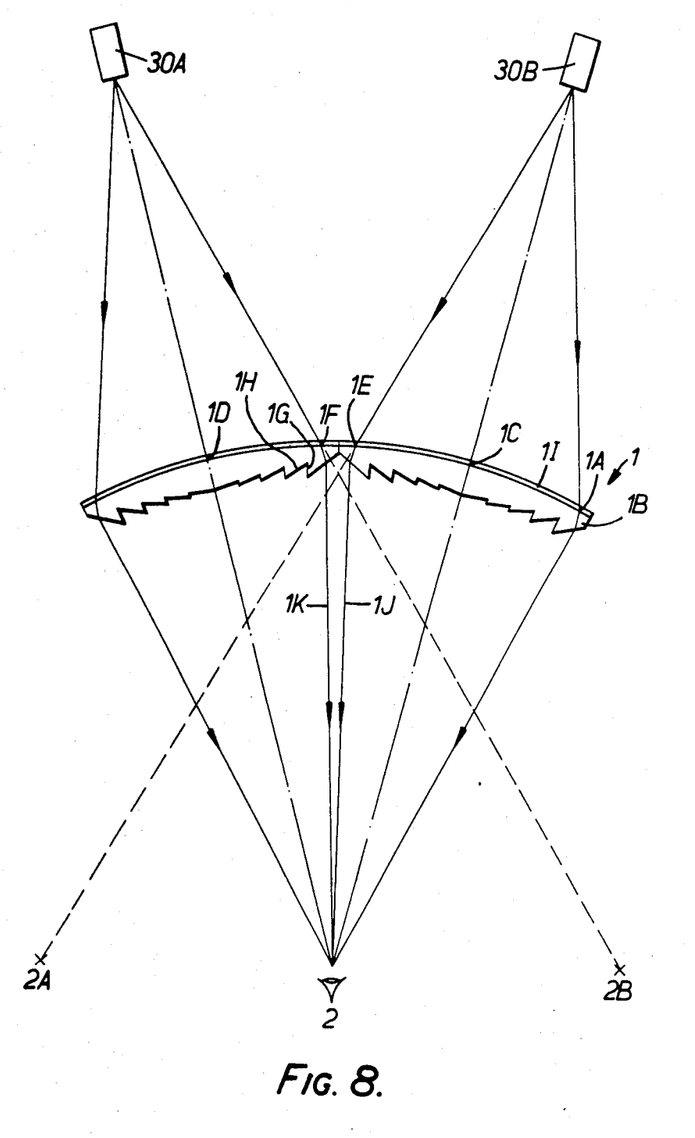
FIG. 8 is a schematic diagram of a display screen indicated generally in FIG. 2.

FIG. 8 shows the screen 1 onto which a picture to be displayed is projected by the projectors 30A and 30B. The screen is part cylindrical in shape and has a layer 1A or translucent material on its side closest to the projectors. This layer 1A serves as a diffuser of light. The observer 2 is located at the centre of curvature of the part cylindrical screen which has a radius D chosen to be sufficiently large to ensure that the projected image on the screen gives a sufficiently approximate illusion of being at infinity. This is because most of the images to be displayed are intended to be of distant objects and features. It is important to note that no diffuser is perfect and that more light incident on it in a given direction continues travelling close to that direction after diffusion than is diffused in any particular direction to the left or to the right. Thus, if one ignores the effect of the member 1B, to be described later, the observer 2 will receive a higher proportion of the light diffused from points 1C and 1D than from points 1E and 1F. This is because light received by the observer from the points 1E and 1F is diffused through a large angle whilst that from the points 1C and 1D is diffused not at all. Thus, in the illustrated system, the picture would, but for the presence of the member 1B, appear to an observer 2 to be brighter at positions near 1C and 1D than near positions 1E and 1F. This in itself is a disadvantage but a much greater problem arises if the observer moves towards positions 2A or 2B, i.e., to the left or to the right. When the observer is at the position 2A the point 1E is directly in line with the projector 30B and so the point 1E appears relatively bright. However, light received by the observer at 2A from point 1F has been diffused through a large angle so point 1F appears relatively dim. The observer thus sees a vertical line down the centre of the screen dividing relatively bright areas illuminated by projector 30B from relatively dim areas illuminated by projector 30A. The aforementioned explanation assumes that the desired brightness of the simulated picture is constant over the whole screen. In practice this is, of course, not often the case but the effects described above often appeal to a greater or lesser degree.

The problem described in the immediately preceding paragraph is mitigated by the use of the part cylindrical transparent sheet 1B. This is located immediately in front of the diffuser 1A. The sheet 1B, which is of uniform thickness, is machined to form a series of vertical grooves. Each groove has a side 1G which is approximately in alignment with the observer 2 and a side 1H which is inclined with respect to the rear surface 1I of the acrylic sheet. The angle of inclination varies from groove to groove and is smallest near points 1C and 1D in line with the projectors and the observer 2. The angle progressively increases with increasing distance from these points 1C and 1D. The direction of inclination of any one face is away from the straight line between the observer 2 and the projector illuminating that face. Thus, each inclined face 1H defines, with the rear surface 1I, a prism which deflects light derived from one of the projectors towards the straight line between the projector and the observer 2. Each part of the sheet 1B, illuminated by a given projector 30A or 30B, can be considered to constitute a cylindrical lens which tends to focus (and would focus but for the diffusion effects of the screen 1A) light from that projector onto the observer position 2.

Considering now the points 1E and 1F, as observed from 2A, the maximum intensity of the diffused light is propagated in the directions of lines 1J and 1K which are almost parallel. Thus, the observer at 2A is offset from these directions by approximately equal angles; causing equal reductions in the brightness of the points 1E and 1F. The sharp dividing line previously mentioned is thus eliminated. Similar comments apply to the observer when he moves to or towards the position 2B.

Figure 9:
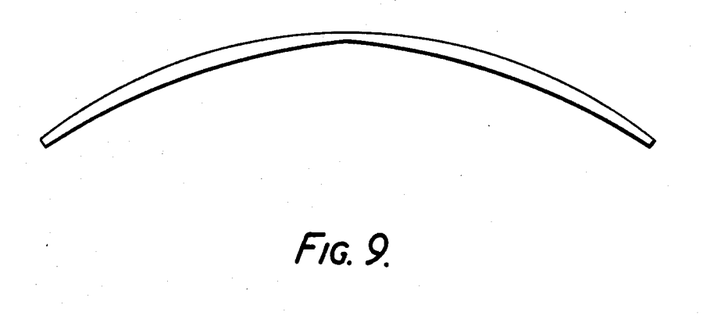
FIGS. 9 and 10 are sectional views of alternative screens to that shown in FIG. 8.
Figure 10:
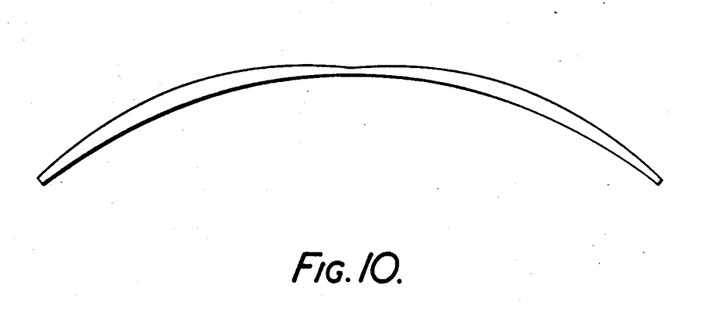

The grooves machined in the sheet 1B may vary in depth and/or width. As an alternative to forming such grooves the rear surface of the member 1B may be continuously varying in inclination with respect to the rear face or vice versa as shown in FIGS. 9 and 10. Another possibility would be to form the grooves on the rear face. The diffuser 1A can be either to the rear or to the front of the member 1B or could be dispensed with if the member 1B were itself capable of diffusing the incident light. It could be surface treated for this purpose.

In some circumstances it may be desired to have a screen which extends through a larger arc than that illustrated. In this case further projectors could be used and the screen would be formed of more than the two sections illustrated.

We claim:

1. A display system comprising a screen and two spaced projectors arranged to illuminate respective parts of the screen, the screen comprising: imperfect diffusion means serving to scatter light incident on its at particular point in a manner such that more of said light is propagated, after scattering, in a given direction of maximum intensity than in any other given direction; and refraction means serving to deflect the light from each of said projectors so as to reduce or eliminate an angle between the directions of maximum intensity of light from said respective projectors which is incident at adjacent points of said respective parts.

2. A display system according to claim 1 in which the screen is translucent thereby allowing the display to be viewed from a side of the screen opposite to the side in which the projectors are located.

3. A display system according to claim 2 in which the refraction means is arranged to deflect the light after scattering.

4. A display system, according to claim 2 or 3 in which the screen is curved and in which the refraction means tends to focus light incident on the screen towards a centre of curvature of the screen.

5. A display system according to claim 1 in which the refraction means is formed by a sheet of transparent material, one surface of which is machined to form a series of facets inclined with respect to each other.

6. Apparatus for storing video data defining a surface extending in three dimensions x, y, and z, the apparatus comprising: first storage means for recording z values of the surface for different x and y co-ordinate values; second storage means for recording groups of x and y co-ordinate values defining the vertices of respective adjacent polygonal areas of the surface, which areas together define a region of the surface having a distinct visual characteristic; and reading means for producing from the z-values sotred in said first storage means, z co-ordinate values associated with each x, y co-ordinate value at each of said vertices recorded in the second storage means.

7. Apparatus according to claim 6 and comprising further storage means for recording further groups of x and y co-ordinate values defining the vertices of further respective adjacent polygonal areas of smaller average size than the first-mentioned polygonal areas; and further means for producing from the z-values stored in the first storage means z co-ordinate values associated with each x, y co-ordinate value at each of said vertices recorded in the further storage means.

8. Apparatus according to claim 6 or 7 in which the first storage means contains particular z values for particular x,y-co-ordinate positions and includes interpolation means for allowing said first storage means to produce a read-out of z values associated with x,y co-ordinate positions different from the particular x,y co-ordinate positions associated with said particular z values.

9. Apparatus for generating successive picture frames depicting a feature to create an illusion of movement comprising: a first store containing description data of each of a plurality of relatively large faces of the feature to be displayed; a second store containing for each of the relatively large faces, description data of each of a group of relatively small faces, together constituting the large face, the description data of each face including a definition of its location and a value which defines its brightness or colour; a processor adapted to process the description data into a form for feeding to a display device so as to produce an image having an illusion of movement formed from successive picture frames; means for accessing description data at a given frame rate from selected locations within said first and second stores and feeding the accessed description data to said processor, the selected locations each corresponding to a respective one of the picture frames; switching means for switching a connection to said processor from said first store to said second store between successive frames; and switch over regulation means for causing the display of a group of small faces immediately after switching from said first store to said second store, with uniform colour or brightness values, and changing these values between subsequent frames towards their respective different values as determined by the description data in said second store.

10. Apparatus according to claim 9 in which the switching means includes a selector means for selecting the first store when the selected features are defined by a sufficiently small amount of description data in the first store to be processed by the processor and selecting the second store at other times.

11. Apparatus according to claim 10 in which the selector means includes means to select, at any one time, that store which results in the processor being used most nearly to its maximum capacity.

12. Apparatus for producing, from the co-ordinates of the end points of a line, a two dimensional image depicting the line as viewed by an observer having one of said points behind him and one in front of him, the apparatus comprising: means for determining a first set of co-ordinates where an image plane is intersected by a line joining the observer to the end point in front of him; means for determining a second set of co-ordinates where the image plane is intersected by the extension of a line joining the observer to the end point behind him; means for receiving the first and second sets of co-ordinates and using such co-ordinates to generate picture signals representing a line defined by an extension of the line joining the first and second sets of co-ordinates; and display means connected for receiving said picture signals and for displaying said line represented thereby.

13. Apparatus for producing, from the co-ordinates of the ends of a line extending from a position behind the observer to a position in front of the observer, a two dimensional image depicting the line as viewed by the observer, the apparatus comprising: means for recognising which of said ends lies in front of and which lies behind the observer; means for calculating from the co-ordinates of a first end, recognised as lying in front of the observer, the co-ordinates of a first point where an image plane is intersected by a line or extension thereof joining the observer to the first end; means for calculating from the co-ordinates of a second end recognised as lying behhnd the observer, the co-ordinates of a second point where the image plane is intersected by an extension of a line joining the second end to the observer; means for receiving the co-ordinates of the first and second points and using such co-ordinates to generate picture signals representing an extension of a line in the image plane joining the second point to the first point, said last mentioned extension being on a side of the first point remote from the second point and defining the said two dimensional image; and display means connected for receiving said picture signals and for displaying said two dimensional image.

14. A raster display system comprising: means for defining a line to be displayed; means for determining the instant when a first part of a raster spot crosses said line and providing a first control signal which changes at that instant; means for determining the instant when a second part of a raster spot crosses the line and providing a second control signal which changes at that instant; means for providing a combined control signal from the first and second control signals; and means for using the combined control signal to vary the brightness and/or colour of the raster spot gradually as it crosses the line.

15. A raster display system according to claim 14 in which the combined control signal has a magnitude equal to an average magnitude of the first and second control signals.

16. A display system as defined in claim 1 wherein said refraction means is located to deflect the light prior to the light being scattered by said diffusion means.

17. A display system as defined in claim 1, wherein said refraction means is located to deflect the light after the light is scattered by said diffusion means.

18. A computer generated imagery system comprising:
position defining means for defining the position of an observation point relative to a scene to be depicted by an image to be displayed,
storage means for storing description data of polygonal faces defining the image to be displayed, the description data of each face including a plurality of codes defining respective different priority values for different angles of view of the scene relative to the observation point, each priority value defining the capability of a face to obscure other faces for a respective one of said different angles of view; and
display means connected to said storage means and responsive to the description data for displaying selected ones of the faces to form an image of the scene to be displayed along a given angle of view relative to the observer, said display means including priority code-responsive means for preventing display of a face having a priority value which is lower than the priority value of another face which lies within the given angle of view.

19. A screen for use in a display system having two spaced optical projectors which are arranged to illuminate different parts of said screen, the projectors having respective optical axes which are inclined toward on another in a direction toward said screen, said screen comprising:
imperfect diffusion means which non-uniformly scatters light so that light from a respective one of the projectors which is incident at a particular point of said diffusion means is propagated by said diffusion means more in a given direction of maximum intensity than in any other direction; and
refraction means located at one side of said diffusion means for deflecting light from each of said projectors for minimizing an angle between the respective directions of maximum intensity of light which is propagated from said screen and which is incident from different ones of said projectors at respective adjacent points of the different parts of said screen.

20. Method for producing, from the co-ordinates of the end points of a line, a two dimensional image depicting the line as viewed by an observer having one of the points behind him and one in front of him, the method comprising:
determining a first set of co-ordinates where an image plane is intersected by a line joining the observer to the end point in front of him;
determining a second set of co-ordinates where the image plane is intersected by the extension of a line joining the observer to the end point behind him; and
displaying on a screen, corresponding to the image plane, a visible line defined by an extension of the line joining the first and second sets of co-ordinates.

21. Method for producing, from the co-ordinates of the ends of a line extending from a position behind the observer to a position in front of the observer, a two dimensional image depicting the line as viewed by the observer, the method comprising:
recognizing which of the ends lies in front of and which lies behind the observer;
calculating from the co-ordinate of a first end, recognized as lying in front of the observer, the co-ordinates of a first point where an image plane is intersected by a line or extension thereof joining the observer to the first end;
calculating from the co-ordinates of a second end recognized as lying behind the observer, the co-ordinates of a second point where the image plane is intersected by an extension of a line joining the second end to the observer;
defining an extension of a line in the image plane joining the second point to the first point, the last mentioned extension being on a side of the second point remote from the first point and defining the two dimensional image; and displaying the two dimensional image on a screen corresponding to the image plane.

22. A simulator comprising:
a. a store containing description data of a threee dimensional shape of a feature to be displayed, said description data including co-ordinate, relative to a datum point, of the end points of a line;
b. control means adapted to be manipulated by an operator to change a signal defining the relative simulated positions of the operator and said datum point;
c. a display device arranged in relation to the said control means so as to display an image to be viewed by the operator;
d. logic means arranged to receive said signal defining the relative simulated positions and said co-ordinates of the end points, said logic means detecting when one of the end points lies behind the simulated operator position and the other lies in front of it;
e. calculating means responsive to the detecting of said logic means and including (1) means for determining a first set of co-ordinates where an image plane is intercepted by a line joining the observer to the end point recognized as being in front of the simulated operator position and (2) means for determining a second set of co-ordinates where the image plane is intercepted by the extension of a line joining the observer to the end point recognized as being behind him; and
f. means for receiving the first and second sets of co-ordinates from the calculating means and using them to generate picture signals and to feed the picutre signals to said display means, whereby the display means is adapted to display a visible line defined by an extension of the line joining the first and second sets of co-ordinates.

* * * * *